US010688411B2

(12) United States Patent
Kobayashi

(10) Patent No.: US 10,688,411 B2
(45) Date of Patent: Jun. 23, 2020

(54) POROUS MOLDING, GEL MOLDING AND FILTER

(71) Applicant: 3M INNOVATIVE PROPERTIES COMPANY, St. Paul, MN (US)

(72) Inventor: Mitsuaki Kobayashi, Tokyo (JP)

(73) Assignee: 3M Innovative Properties, Inc., St. Paul, MN (US)

( * ) Notice: Subject to any disclaimer, the term of this patent is extended or adjusted under 35 U.S.C. 154(b) by 187 days.

(21) Appl. No.: 15/536,502

(22) PCT Filed: Feb. 1, 2016

(86) PCT No.: PCT/US2016/015891
§ 371 (c)(1),
(2) Date: Jun. 15, 2017

(87) PCT Pub. No.: WO2016/126574
PCT Pub. Date: Aug. 11, 2016

(65) Prior Publication Data
US 2017/0333810 A1 Nov. 23, 2017

(30) Foreign Application Priority Data

Feb. 3, 2015 (JP) ................. 2015-019504

(51) Int. Cl.
B01D 15/08 (2006.01)
B01J 20/26 (2006.01)
B01J 39/05 (2017.01)
B29C 43/00 (2006.01)
B01J 20/28 (2006.01)
C02F 1/42 (2006.01)
B29C 67/04 (2017.01)
B01J 47/018 (2017.01)
B01J 45/00 (2006.01)
B01J 20/10 (2006.01)
B01J 20/30 (2006.01)
B01J 20/08 (2006.01)
C02F 1/28 (2006.01)
B29K 23/00 (2006.01)
B29K 105/04 (2006.01)
B29L 31/14 (2006.01)

(52) U.S. Cl.
CPC .............. *B01D 15/08* (2013.01); *B01J 20/08* (2013.01); *B01J 20/10* (2013.01); *B01J 20/261* (2013.01); *B01J 20/262* (2013.01); *B01J 20/28004* (2013.01); *B01J 20/28042* (2013.01); *B01J 20/28047* (2013.01); *B01J 20/3007* (2013.01); *B01J 39/05* (2017.01); *B01J 45/00* (2013.01); *B01J 47/018* (2017.01); *B29C 43/003* (2013.01); *B29C 43/006* (2013.01); *B29C 67/04* (2013.01); *C02F 1/288* (2013.01); *C02F 1/42* (2013.01); *B01J 2220/46* (2013.01); *B29K 2023/0683* (2013.01); *B29K 2105/04* (2013.01); *B29K 2995/0068* (2013.01); *B29L 2031/14* (2013.01)

(58) Field of Classification Search
None
See application file for complete search history.

(56) References Cited

U.S. PATENT DOCUMENTS

| 4,061,807 A | 12/1977 | Shaler |
| 6,710,093 B2 * | 3/2004 | Yao ........................ B01J 47/018 521/27 |
| 2004/0212123 A1 | 10/2004 | Koizumi |
| 2007/0079702 A1 | 4/2007 | Hurley |

FOREIGN PATENT DOCUMENTS

| JP | 10-017699 | 1/1998 | |
| JP | 10-323531 | 12/1998 | |
| JP | 4220832 B2 | 11/2008 | |
| JP | 2010-254841 | 11/2010 | |
| WO | WO 2001/037995 | 1/2001 | |
| WO | WO 2005/118108 | 12/2005 | |
| WO | WO-2012122022 A1 * | 9/2012 | ......... B01D 39/1661 |
| WO | WO-2013151654 A1 * | 10/2013 | ........... B01D 15/361 |

OTHER PUBLICATIONS

Rohm and Haas, Product Data Sheet for Amberlite IR120H Industrial Grade Strong Acid Cation Exchanger, Jan. 2008, pp. 1-2. (Year: 2008).*

* cited by examiner

Primary Examiner — Matthew O Savage

(57) ABSTRACT

To provide a porous molding that can be used as a molding that has sufficient strength to be self-supportable even when the dimensions change due to absorbing water and that can be suitably used as a filter for removing impurities in a liquid or gas. A porous molding is achieved by sintering a mixed powder including a dried gel powder and a thermoplastic resin powder, wherein the ratio of average particle diameter $d_1$ of the thermoplastic resin powder to the average particle diameter $d_2$ of the dried gel powder $d_2/d_1$ is 1.3 or greater, and the difference ratio of average particle diameter $d_1$ of the thermoplastic resin powder to the average particle diameter $d_2$ of the dried gel powder and the average particle diameter $d_3$ of the dried gel powder when absorbing water and swelling is $(d_3-d_2)/d_1$ is 4.0 or less.

15 Claims, No Drawings

POROUS MOLDING, GEL MOLDING AND FILTER

CROSS REFERENCE TO RELATED APPLICATIONS

This application is a national stage filing under 35 U.S.C. 371 of PCT/US2016/015891, filed Feb. 1, 2016, which claims the benefit of Japanese Patent Application No. 2015-019504, filed Feb. 3, 2015, the disclosures of which are incorporated by reference in their entirety herein.

BACKGROUND

Gel materials use characteristics such as water absorbency and oil absorbency, and are used as water absorbing solvent or oil absorbing solvent that remove water or oil from a liquid or gas. Furthermore, after introducing an ion exchange group and a chelate group to gel materials, gel materials are also used as selective functional absorbing material.

For example, in Patent Document 1, a method is disclosed that fixes ion exchange particles in hydrogel. Japanese Unexamined Patent Application Publication (Translation of PCT Application) No. 2003-514658

SUMMARY OF THE INVENTION

The present invention relates to a porous molding and a gel molding. Furthermore, the present invention relates to a filter including a porous molding and/or a gel molding. Even further, the present invention relates to a method for removing moisture using a porous molding and a method for removing metal ion using a gel molding.

Because gel materials have large changes in dimension and strength reduction due to absorbing water, it has been hard to use gel materials as moldings that are strong and are self-supportable.

An object of the present invention is to provide a porous molding that can be used as a molding that has sufficient strength to be self-supportable even when the dimensions change due to absorbing water and that can be suitably used as a filter for removing impurities in a liquid or gas. Furthermore, another object of the present invention is to provide a gel molding that can be suitably used as a filter that removes impurities from a liquid or gas and has strength to be able to be self-supportable. Even further, another object of the present invention is to provide a filter including a porous molding and/or a gel molding, a method for removing moisture and a method for removing metal ion using a filter.

An aspect of the present invention relates to a porous molding that is achieved by sintering a mixed powder including dried gel powder and thermoplastic resin powder. With the porous molding, the ratio of average particle diameter $d_1$ of the thermoplastic resin powder to the average particle diameter $d_2$ of the dried gel powder $d_2/d_1$ is 1.3 or greater, and the difference ratio of average particle diameter $d_1$ of the thermoplastic resin powder to the average particle diameter $d_2$ of the dried gel powder and the average particle diameter $d_3$ of the dried gel powder when absorbing water and swelling is $(d_3-d_2)/d_1$ is 4.0 or less.

In the porous molding, the dried gel powder is fixed by the thermoplastic resin powder, and sufficient strength to be self-supportable can be maintained even when the dimension changes are brought about when swelling by absorbing water. Because of this, the porous molding can be suitably used as a filter that removes impurities in a liquid or gas.

In one embodiment, the coefficient of water absorption of the dried gel powder may be 30% mass or more and 90% mass or less.

In one embodiment, the average particle diameter $d_1$ of the thermoplastic resin powder may be 0.1 μm or more, and 100 μm or less.

In one embodiment, the average particle diameter $d_2$ of the dried gel powder may be 50 μm or more, and 250 μm or less.

In one embodiment, the thermoplastic resin powder may include ultra-high molecular weight polyethylene or polyamide.

In one embodiment, the thermoplastic resin powder may include ultra-high molecular weight polyethylene, and the weight-average molecular weight of the ultra-high molecular weight polyethylene may be $1.0 \times 10^6$ g/mol or greater, and $1.2 \times 10^7$ g/mol or less.

In one embodiment, the thermoplastic resin powder may be a non-spherical resin powder.

In one embodiment, the dried gel powder may have at least one type of functional group selected from a group made up of an ion exchange group and a chelate group.

Another aspect of the present invention relates to a gel molding that is achieved by the porous molding swelling with water. This type of gel molding has sufficient strength to be self-supportable while having exceptional absorption properties as a gel material, and can be suitably used as a filter that removes impurities from a liquid or gas.

One aspect of the present invention relates to a filter that includes the porous molding and/or the gel molding.

One aspect of the present invention relates to a method for removing moisture from a processing liquid. The method has a step for passing the processing liquid through a filter including a porous molding.

One aspect of the present invention relates to a method for removing metal ion from a processing liquid. The method has a step for passing the processing liquid through a filter including a gel molding achieved by the porous molding swelling with water.

According to the present invention, a porous molding is provided that can be suitably used as a filter that removes impurities from a liquid or gas, wherein sufficient strength to be self-supportable is maintained even when the dimensions change after swelling due to absorbing water. Furthermore, according to the present invention, a gel molding is provided that can be suitably used as a filter that removes impurities from a liquid or gas, having sufficient strength to be self-supportable while also having exceptional absorption properties as a gel material. Moreover, according to the present invention, a filter including a porous molding and/or a gel molding, a method for removing moisture and a method for removing metal ion using a filter is provided.

MODE FOR CARRYING OUT THE INVENTION

Preferable embodiments of the present invention will be described below.

A porous molding according to the present embodiment is a molding achieved by sintering a mixed powder including dried gel powder and thermoplastic resin powder. With this porous molding, the ratio of average particle diameter $d_1$ of the thermoplastic resin powder to the average particle diameter $d_2$ of the dried gel powder $d_2/d_1$ is 1.3 or greater, and the difference ratio of average particle diameter $d_1$ of the thermoplastic resin powder to the average particle diameter $d_2$ of the dried gel powder and the average particle diameter $d_3$ of the dried gel powder when absorbing water and swelling is $(d_3-d_2)/d_1$ is 4.0 or less.

According to the porous molding according to the present embodiment, the dried gel powder is fixed by the thermoplastic resin powder, and the strength to be self-supportable can be maintained even when the dimensions change when swelling by absorbing water.

Because of this, the porous molding according to the present embodiment can be suitably used as a filter that removes impurities in a liquid or gas.

In the present embodiment, the average particle size of $d_1$ of the thermoplastic resin powder is shown by the value D50 found by the laser diffraction type/scatter method in compliance with JIS Z 8825: 2013. More specifically, for thermoplastic resin powder, the particle size distribution is found by a laser diffraction type/scatter method using a master sizer 3000 manufactured by Malvem, (Worcester, England), and D50, which is 50% after calculating the particle number from the smallest of the whole, is set to the average particle diameter $d_1$.

The average particle diameter $d_3$ of the dried gel powder when absorbing water and swelling is shown as the average particle diameter of swollen gel, which is achieved when the dried gel powder has swollen with a sufficient amount of water. In the present embodiment, the average particle size of $d_3$ of the swollen gel is shown by the value D50 found by the laser diffraction type/scatter method in compliance with JIS Z 8825: 2013. More specifically, for the swollen gel, the particle size distribution is found by a laser diffraction type/scatter method using a master sizer 3000 manufactured by Malvem, (Worcester, England), and D50, which is 50% after calculating the particle number from the smallest of the whole, is set to the average particle diameter $d_3$.

In the present embodiment, the average particle diameter $d_2$ of the dried gel powder shows the value found by formula (I) below from the average particle diameter $d_3$ of the swollen gel and the coefficient of linear expansion $\alpha$ by water absorption of the dried gel powder.

Average Particle Distribution $$d_2 = \text{average particle distribution } d_3/(1+\text{coefficient of linear expansion } \alpha) \quad (I)$$

In the present embodiment, the coefficient of linear expansion $\alpha$ by water absorption of the dried gel powder shows the value found by the method below. First, the volume ($V_1$) of the dried gel powder and the volume ($V_2$) of the swollen gel achieved when the dried gel powder has swollen with a sufficient amount of water is found from the apparent density measured by the method in compliance with JIS K 7365: 1999. The coefficient of linear expansion $\alpha$ is achieved from these volumes $V_1$ and $V_2$ by the formula (II) below.

$$\text{Coefficient of linear expansion } \alpha=((V_2/V_1)^{1/3}-1) \quad (II)$$

The ratio of the average particle diameter $d_2$ of the dried gel powder to the average particle diameter $d_1$ of the thermoplastic resin powder $d_2/d_1$ is 1.3 or more, preferably 2 or more. When the ratio $d_2/d_1$ is less than 1.3, the fixed powder is released due to the change in dimensions by swelling, and may lead to the collapse of the molding. Furthermore, the ratio $d_2/d_1$ is preferably 50 or less, and more preferably 25 or less.

The difference ratio of average particle diameter $d_1$ of the thermoplastic resin powder to the average particle diameter $d_2$ of the dried gel powder and the average particle diameter $d_3$ of the dried gel powder when absorbing water and swelling $(d_3-d_2)/d_1$ is 4.0 or less, and preferably 3.0 or less.

When the ratio $(d_3-d_2)/d_1$ exceeds 4.0, the fixed powder is released due to the change in dimensions by swelling, and may lead to the collapse of the molding. Furthermore, the ratio $(d_3-d_2)/d_1$ is preferably 0.2 or more, and more preferably 0.3 or more.

In the present embodiment, the dried gel powder may be a powder that assumes a gel shape by swelling due to the absorption of water, and can be obtained by, for example, drying hydrogel particles.

It is preferable for the coefficient of water absorption of the dried gel powder to be 30% mass or more, and more preferably 40% mass or more. By selecting that with a coefficient of water absorption of 30% or more as a dried powder gel, the porous molding becomes more excellent in water absorbing properties, and can therefore be used more suitably as a filter for removing moisture.

It is preferable for the coefficient of water absorption of the dried gel powder to be 90% mass or less, and more preferably 60% mass or less. When the coefficient of water absorption of the dried gel powder is 90% mass or less, the strength of a gel molding described hereafter tends to improve more.

Note that the coefficient of water absorption of the dried gel powder in the present specification shows a value found by the drying loss method in compliance with JIS K 7209: 2000. More specifically, the weight ($W_1$) of the swollen gel achieved by the dried gel powder absorbing a sufficient amount of water is measured, and after drying for 24 hours in an oven (DRM620DB manufactured by ADVENTEC (Tokyo-to, Bunkyo-ku)) of 105° C., the dry weight ($W_2$) is measured and the coefficient of water absorption is found by formula (III) below.

$$\text{Coefficient of water absorption } (\%)=(W_1-W_2)\times 100/W_1 \quad (III)$$

In the dried gel powder, it is preferable for the coefficient of volumetric expansion by water absorption to be 1% or more, and more preferably 5% or more. Because dried gel powder that has a coefficient of volumetric expansion of 1% or more excels in water absorbing properties, porous moldings that use this kind of dried gel powder can be used more suitably as filters for removing moisture.

It is preferable for the coefficient of volumetric expansion by water absorption of the dried gel powder to be 5 or less, and more preferably 2.5 or less. When the coefficient of volumetric expansion is 5 or less, the strength of a gel molding described hereafter tends to improve more.

Note that in the present specification, the coefficient of volumetric expansion by water absorption of the dried gel powder shows a value found by formula (IV) below from the volume ($V_1$) of the dried gel powder and the volume ($V_2$) of the swollen gel achieved when the dried gel powder has swollen with a sufficient amount of water described earlier.

$$\text{Coefficient of volumetric expansion}=V_2/V_1 \quad (IV)$$

The average particle diameter $d_1$ of the dried gel powder is not particularly limited as long as the ratio $d_2/d_1$ and the ratio $(d_3-d_2)/d_1$ are in the above ranges, but, for example, may be 0.1 μm or more, and is preferably 1 μm or more. Furthermore, the average particle diameter $d_1$ of the dried gel powder may be, for example, 1000 μm or less, and is preferably 200 μm or less.

The dried gel powder can be achieved by, for example, drying hydrogel particles. The drying method is not particularly limited, and methods such as, for example, hot air drying, agitation drying, vacuum drying, and the like are given.

It is preferable for the dried gel powder to be dried so as to have a water content of 10% mass or less. It is preferable for the water content of the dried gel powder to be 10% mass or less, and more preferably 5% mass or less.

Note that the water content of the dried gel powder in the present specification shows a value measured by a drying loss method. More specifically, the weight ($W_3$) of the dried gel powder is measured, and after drying for 24 hours in an oven (DRM620DB manufactured by ADVENTEC (Tokyo-to, Bunkyo-ku) of 105° C., the dry weight ($W_4$) is measured and the coefficient of water absorption is found by formula (V) below.

$$\text{Water content (\%)} = (W_3 - W_4)/W_3 \times 100 \quad (V)$$

The dried gel powder may have at least one type of functional group selected from a group made up of an ion exchange group and a chelate group. By using this kind of dried gel powder, the gel molding that has caused the porous molding to swell can be suitably used as a filter for removing metal ion.

As an ion exchange group, for example, a sulfonic acid group, a carbonic acid group, a tertiary amine group, a quaternary group and the like are given.

As a chelate group, for example, a polyamine, an aminophosphoric acid group, an iminodiacetic acid group, a urea group, a thiol group, a dithiocarbamic acid group and the like are given.

The dried gel powder may include, for example, organic polymer. As organic polymer that becomes the main component of the dried gel powder, for example, polystyrene, acrylic resin, polyvinyl alcohol, cellulose, polyamide and the like are given. Note that main component here refers to that contains 80% of the mass or more (preferably 90% mass or more, more preferably 95% mass or more). These organic polymers may have the functional group described above, and may be crosslinked by a crosslinking agent such as divinylbenzene.

The dried gel powder may include inorganic material. As inorganic material, for example, silica gel, alumina gel, smectite and the like are given. These inorganic materials may be enhanced to have the functional group described above.

In the present embodiment, the thermoplastic resin powder is a powder made up of resin material with thermoplastic resin as a main component, and can form a porous structure by fusing together by sintering.

In the resin material that configures the thermoplastic resin powder, it is preferable for the content of thermoplastic resin based on the total amount of resin material (standard total amount of thermoplastic resin powder) to be 80% mass or more, more preferably 90% mass or more, and most preferably 95% mass or more.

The resin material may include components other than thermoplastic resin, and may, for example, include a plasticizer such as stearic acid salt, talc, silica, antioxidants, and the like.

Preferably, the resin material includes at least one thermoplastic resin selected from a group made up of ultra-high molecular weight polyethylene and polyamide.

As ultra-high molecular weight polyethylene, with a weight-average molecular weight of $7.5 \times 10^5$ g/mol or greater and $5 \times 10^7$ g/mol or less is preferable, and with a weight-average molecular weight of $1.0 \times 10^6$ g/mol or greater and $1.2 \times 10^7$ g/mol or less is more preferable. Note that the weight-average molecular weight of the ultra-high molecular weight polyethylene is the value measured by the method below.

1. "Standard Test Method for Dilute Solution Viscosity of Ethylene Polymers," D1601, Annual Book of ASTM Standards, American Society for Testing and Materials.
2. "Standard Specification for Ultra-High-Molecular-Weight Polyethylene Molding and Extrusion Materials," D4020, Annual Book of ASTM Standards, American Society for Testing and Materials The melting point of ultra-high molecular weight polyethylene is not particularly limited, and may be between, for example, 130° C. and 135° C. Furthermore, it is preferable for the melt index of the ultra-high molecular weight polyethylene to be 1.0 g/10 min (ASTM D1238 (ISO1133), 190° C., load 21.6 kg) or less, and more preferably, 0.5 g/10 min or less.

As polyamide, for example, a semicrystalline polyamide microparticles with a melting point of 150° C. or more and 200° C. or less can be suitably used. Furthermore, as this kind of polyamide, it is preferable for the average number of carbon atoms per monomer unit to be 10 or more.

The average particle diameter $d_1$ of the thermoplastic resin powder is not particularly limited, and may be, for example, 0.5 μm or more, and may be 1 μm or more. Furthermore, the average particle diameter $d_1$ of the thermoplastic resin powder may be, for example, 1000 μm or less, and may be 100 μm or less. By increasing the average particle diameter $d_1$ of the thermoplastic resin powder, the gaps in the porous molding increase and liquid passing properties tend to improve, and by decreasing the average particle diameter $d_1$, the molding becomes denser, and strength tends to improve further.

When the thermoplastic resin powder is a powder made up of resin material with ultra-high molecular weight polyethylene as the main component, it is preferable for the ratio of the average particle diameter $d_2$ of the dried gel powder to the average particle diameter $d_1$ of the thermoplastic resin powder $d_2/d_1$ to be 1.3 or more, also preferably 13 or less, and more preferably 10 or less. Furthermore, it is preferable for the difference ratio of the average particle diameter $d_1$ of the thermoplastic resin powder to the average particle diameter $d_2$ of the dried gel powder and the average particle diameter $d_3$ of the dried gel powder when absorbing water and swelling $(d_3-d_2)/d_1$ to be 4 or less, more preferably 3.0 or less, and preferably 0.2 or more, and more preferably 0.3 or more.

When the thermoplastic resin powder is a powder made up of resin material with polyamide as the main component, it is preferable for the ratio of the average particle diameter $d_2$ of the dried gel powder to the average particle diameter $d_1$ of the thermoplastic resin powder $d_2/d_1$ to be 1.3 or more, also preferably 50 or less, and more preferably 25 or less. Furthermore, it is preferable for the difference ratio of the average particle diameter $d_1$ of the thermoplastic resin powder to the average particle diameter $d_2$ of the dried gel powder and the average particle diameter $d_3$ of the dried gel powder when absorbing water and swelling $(d_3-d_2)/d_1$ to be 4 or less, more preferably 3 or less, and preferably 0.2 or more, and more preferably 0.3 or more.

It is preferable for the thermoplastic resin powder to be a non-spherical resin powder. The thermoplastic resin powder may, for example, have a shape with fine particles clumped together in the shape of a bundle of grapes, and may have a confetti-like shape with a plurality of protrusions on the spherical particles. According to the non-spherical thermoplastic resin powder, tolerance to a change in dimensions when swelling tends to improve further.

It is preferable for the thermoplastic resin powder to be a porous powder. The bulk density of the porous thermoplastic resin powder may be, for example, 0.1 to 0.7 g/cm$^3$, and may be 0.2 to 0.6 g/cm$^3$. Note that in the present specification, the bulk density of the porous thermoplastic resin powder shows a value measured by a method in compliance with ISO60.

The porous molding according to the present embodiment is formed by sintering a mixed powder including dried gel powder and thermoplastic resin powder.

In one aspect of the porous molding according to the present embodiment, it can be said that the dried gel powder is fixed by dispersing in the porous molding structure formed by the sintering of the thermoplastic resin powder. Furthermore, it can be said that the porous molding is a molding where dried gel powder is bound together by the thermoplastic resin powder.

In the mixed powder, it is preferable for the content of dried gel powder to be 10 parts mass or more in relation to 100 parts mass of the content of the thermoplastic resin powder, and more preferably 25 parts mass or more.

Furthermore, in the mixed powder, it is preferable for the content of dried gel powder to be 900 parts mass or less in relation to 100 parts mass of the content of the thermoplastic resin powder, and more preferably 300 parts mass or less.

The mixed powder may further include ingredients other than dried gel powder and thermoplastic resin powder as an additive. For example, the mixed powder may further include activated carbon, heavy metal reducing media, arsenic removing media, anti-microbial media, ion exchange media, iodination, resin, fiber, gas adsorption media, or the like. It is preferable for the content of these additives to be 20% mass or less of the standard total amount of mixed powder, more preferably 5% mass or less.

In the present embodiment, the mixed powder is sintered by filling a mold or the like based on the desired shape of the porous molding. The sintering of the mixed powder can be performed by a condition in which the fusing of thermoplastic resin powder occurs.

The sintering temperature can be made a temperature equal to or greater than the melting point of the thermoplastic resin included in the thermoplastic resin powder. The sintering temperature can be, for example, 140° C. or more, and is preferably 150° C. or more. Furthermore, the sintering temperature may be, for example, 200° C. or less, and may be 180° C. or less.

The sintering time is not particularly limited, and can, for example, be 5 to 120 minutes, and may be 10 to 60 minutes.

The porous molding can be molded in various shapes by appropriately selecting the mold that is filled with the mixed powder when sintering. For example, the porous molding can be molded into various shapes such as a disc shape, a hollow cylindrical shape, a bell shape, a cone shape, a hollow star shape, and the like.

The porous molding can be suitably used as a filter for removing moisture in a liquid (particularly an organic solvent) or a gas, because it has high water absorbing properties because the dried gel powder is fixed. Furthermore, the porous molding is hard to break even when the dimensions change due to water absorption, and can be suitably used for a long period of time as a molding that can be self-supportable.

The porous molding can be suitably used as a removal method that removes moisture from, for example, a processing liquid.

The processing liquid that the removal method is performed on is not particularly limited, and may be, for example, an organic solvent such as alcohols, esters, ethers, or ketones. As specific examples of processing liquid, ethanol, ethyl lactate, propylene glycol 1-monomethyl ether 2-acetate, cyclopentanone, and the like are given.

In the present embodiment, a gel molding is formed by making the porous material swell, and that gel molding can then be used as a filter. In other words, the porous molding can be suitably used as the precursor for forming a gel molding. The porous molding can, for example, be made to swell with water. Furthermore, the porous molding can be made to swell with a polar solvent such as ethyl lactate or 1-methoxy 2-propanol.

The gel molding according present embodiment has sufficient strength to be self-supportable while having exceptional absorption properties as a gel material. Because of this, the gel molding can be suitably used as a filter that removes impurities in a liquid (particularly water) or gas.

In the present embodiment, particularly when applying that having an ion exchange group or a cherate group as dried gel powder, the gel molding can be suitably used as a filter for removing metal ion in water.

Granular adsorbent material made up of conventional gel material was generally used by filling a column or the like because fixation is difficult, but the gel powder according to the present embodiment can be used by itself as a filter because it has sufficient strength to be self-supportable.

Furthermore, with conventional gel material, a by-pass is formed in the column and there are times that impurities from the processing liquid pass through without being removed. Regarding this, because a fine porous structure is formed by the thermoplastic resin powder, the formation of a by-pass is suppressed with the gel molding according to the present embodiment. Furthermore, because the gel particles are bound with sufficient strength, the formation of a by-pass due to a change in shape when being used is also suppressed. Because of this, the gel molding according to the present embodiment can remove impurities with high efficiency when compared with conventional gel material, even when filling a filling instrument such as a column.

It is preferable for the maximum bending stress of the gel molding to be 5 kgf/cm$^2$ or more, more preferably 8 kgf/cm$^2$ or more, and further preferably 10 kgf/cm$^2$ or more. A gel molding that has this kind of maximum bending stress has sufficient strength to be self-supportable, and can be particularly suitably used as a filter. Note that in the present specification, the maximum bending stress shows a value measured by a method described in the embodiment.

The gel molding can be suitably used as a removal method that removes impurities from, for example a processing liquid.

The removal method has a step for passing the processing liquid through a filter including a gel molding. According to this kind of removal method, impurities in the processing liquid can be simply removed by the gel molding.

Furthermore, when the gel molding has, for example, an ion exchange group or a chelate group, the gel molding can be suitably used in a removal method that removes metal ion from a processing liquid.

The processing liquid that the removal method is performed on is not particularly limited, and, for example, liquid for photoresistance and the raw material liquid thereof, liquid for a nano-imprint and the raw material liquid thereof, silicon liquid, nuclear cooling water, pharmaceutical synthetic drugs and the like may be applied as the processing liquid.

Above, suitable embodiments of the present invention were given, but the present invention is not limited to the embodiments described above.

EMBODIMENTS

Below, the invention will be described more specifically with examples, but the present invention is not limited to the examples.

Preparation of Dried Gel Powder 1

After drying product name "DIAION SK1BH" (Gel type strong acidic positive ion exchange resin particles) manufactured by Mitsubishi Chemical (Tokyo-to, Chiyoda-ku) for 36 hours in an oven (DRM620DB manufactured by ADVENTEC (Tokyo-to, Bunkyo-ku) of 110° C., a dried gel powder A0 was obtained with an average particle diameter $d_2$ of 440 µm.

Next, the dried gel powder A0 was ground, and dried gel powders A1 to A5 were prepared, with respective average particle diameters $d_2$ of 40 µm (A1), 60 µm (A2), 83 µm (A3), 90 µm (A4), and 100 µm (A5).

Preparation of Dried Gel Powder 2

After drying product name "DOWEX MARATHON MSC" (strong acidic cation exchange resin particles, coefficient of water absorbency: approx. 50%, coefficient of linear expansion α: 0.17) manufactured by DOW Chemical for 36 hours or more in an oven (DRM620DB manufactured by ADVENTEC (Tokyo-to, Bunkyo-ku)) of 110° C., a dried gel powder B1 was achieved with an average particle diameter $d_2$ of 110 µm.

Thermoplastic Resin Powder A

In the embodiment below, product name "GUR 2126" (ultra-high molecular weight polyethylene powder, weight-average molecular weight: approx. $4.5 \times 10^6$ g/mol, average particle diameter $d_1$: 32 µm) manufactured by Celanese Corp. (Oberhausen, Germany) was used as the thermoplastic resin powder A1. Furthermore, product name "GUR 2122" (ultra-high molecular weight polyethylene powder, weight-average molecular weight: approx. $4.5 \times 10^6$ g/mol, average particle diameter $d_1$: 130 µm) manufactured by Celanese Corp. (Oberhausen, Germany) was used as the thermoplastic resin powder A2.

Thermoplastic Resin Powder B

In the embodiment below, product name "Amilan SP-500" (semicrystalline polyamide 12 (PA12) microparticle, average particle diameter $d_1$: 5 µm) manufactured by TORAY INDUSTRIES (Tokyo-to, Chuo-ku) was used as the thermoplastic resin powder B1. Furthermore, product name "Amilan SP-10" (semicrystalline polyamide 12 (PA12) microparticle, average particle diameter $d_1$: 10 µm) manufactured by TORAY INDUSTRIES (Tokyo-to, Chuo-ku) was used as the thermoplastic resin powder B2.

Example 1

The dried gel powder A4 (50 parts mass) with an average particle diameter of 90 µm and the thermoplastic resin powder A1 (50 parts mass) with an average particle diameter of 32 µm were mixed, and a circular disc-shaped porous molding was produced with a thickness of 5 mm, a diameter of 47 mm, and a weight of 5 g after filling in a circular disc-shaped mold and heating for 10 minutes in an oven of 160° C.

The filtering abilities of the produced porous molding were evaluated by the pressure loss (ventilation resistance) when air was passed through at a rate of 17 L per minute. As a result of the evaluation, the pressure loss of the porous molding was 8 kPa.

Next, after immersing the produced porous molding in a large amount of water and causing it to swell, a swollen gel molding was obtained with a thickness of 5.6 mm and a diameter of 53 mm. The gel molding maintained a disc shape, and had sufficient strength to be self-supportable.

The maximum bending stress of the achieved gel molding was found through a 3-point maximum bending stress test method in accordance with JIS K 7171: 2008. Specifically, a rectangular test fragment with a width (b) of 15 mm, a length of 50 mm, a thickness (h) of 5 to 7 mm was produced from the gel molding, the test fragment was placed on a platform with a fulcrum interval of 40 mm using a tensile compressing test apparatus (SV-55C, manufactured by Maeda Seisakusho (Aichi-ken, Toyohashi-shi), and the maximum load (F) was measured by placing a load F on the center of the fulcrum. The maximum bending stress was calculated using the formula below.

$$\text{Maximum bending stress} = (3 \times F \times L)/(2 \times b \times h^2)$$

The maximum bending stress achieved in this method was 35 kgf/cm².

Example 2

Other than using the dried gel powder A2 with an average particle diameter of 60 µm as the dried gel powder, a circular disc-shaped porous molding was produced with a thickness of 5 mm, a diameter of 47 mm, and a weight of 5 g in the same manner as in Example 1.

After evaluating the filtering abilities of the produced porous molding in the same manner as Example 1, the pressure loss was 13 kPa.

Next, after immersing the produced porous molding in a large amount of water and causing it to swell, a swollen gel molding was obtained with a thickness of 5.5 mm and a diameter of 52 mm. The gel molding maintained a disc shape, and had sufficient strength to be self-supportable. Furthermore, after measuring the maximum bending stress of the obtained gel molding in the same manner as Example 1, the maximum bending stress was 12 kgf/cm².

Comparative Example 1

Other than using the dried gel powder A0 with an average particle diameter of 440 µm as the dried gel powder, a circular disc-shaped porous molding was produced with a thickness of 5 mm, a diameter of 47 mm, and a weight of 5 g in the same manner as in Example 1.

After evaluating the filtering abilities of the produced porous molding in the same manner as Example 1, the pressure loss was 9 kPa.

Next, after immersing the produced porous molding in a large amount of water and causing it to swell, a collapse of particles occurred, and the disc shape was not maintained.

Example 3

The dried gel powder A5 (70 parts mass) with an average particle diameter of 100 µm and the thermoplastic resin powder A1 (30 parts mass) with an average particle diameter of 32 µm were mixed, and a circular disc-shaped porous molding of 5 mm and a diameter of 47 mm was produced by filling in a circular disc-shaped mold and heating for 10 minutes in an oven of 160° C.

The filtering abilities of the produced porous molding were evaluated by the pressure loss when air was passed through at a rate of 17 L per minute. As a result of the evaluation, the pressure loss of the porous molding was 6 kPa.

Next, after immersing the produced porous molding in a large amount of water and causing it to swell, a swollen gel molding was obtained with a thickness of 5.6 mm and a diameter of 54 mm. The gel molding maintained a disc shape, and had sufficient strength to be self-supportable. Furthermore, after measuring the maximum bending stress of the obtained gel molding in the same manner as Example 1, the maximum bending stress was 12 kgf/cm².

Example 4

Other than changing the amounts of the dried gel powder A5 and the thermoplastic resin powder A1 to 50 parts mass, a circular disc-shaped porous molding was produced with a thickness of 5 mm, a diameter of 47 mm, and a weight of 5 g in the same manner as in Example 3.

After evaluating the filtering abilities of the produced porous molding in the same manner as Example 3, the pressure loss was 6 kPa.

Next, after immersing the produced porous molding in a large amount of water and causing it to swell, a swollen gel molding was obtained with a thickness of 5.5 mm and a diameter of 50 mm. The gel molding maintained a disc shape, and had sufficient strength to be self-supportable. Furthermore, after measuring the maximum bending stress of the obtained gel molding in the same manner as Example 1, the maximum bending stress was 34 kgf/cm2.

Example 5

Other than using the dried gel powder A1 with an average particle diameter of 40 μm as the dried gel powder, a circular disc-shaped porous molding was produced with a thickness of 5 mm, a diameter of 47 mm, and a weight of 5 g in the same manner as in Example 3.

After evaluating the filtering abilities of the produced porous molding in the same manner as Example 3, the pressure loss was 17 kPa.

Next, after immersing the produced porous molding in a large amount of water and causing it to swell, a swollen gel molding was obtained with a thickness of 5.6 mm and a diameter of 53 mm. The gel molding maintained a disc shape, and had sufficient strength to be self-supportable. Furthermore, after measuring the maximum bending stress of the obtained gel molding in the same manner as Example 1, the maximum bending stress was 12 kgf/cm².

Comparative Example 2

Other than using the thermoplastic resin powder A2 with an average particle diameter of 130 μm as the thermoplastic resin powder, a circular disc-shaped porous molding was produced with a thickness of 5 mm and a diameter of 47 mm in the same manner as in Example 3.

After evaluating the filtering abilities of the produced porous molding in the same manner as Example 3, the pressure loss was 2 kPa.

Next, after immersing the produced porous molding in a large amount of water and causing it to swell, a swollen gel molding was obtained with a thickness of 5.8 mm and a diameter of 53 mm. While the gel molding maintained a disc shape, it did not have sufficient strength to be self-supportable. Furthermore, after measuring the maximum bending stress of the obtained gel molding in the same manner as Example 1, the maximum bending stress was 2 kgf/cm².

Comparative Example 3

Other than mixing the dried gel powder A5 (50 parts mass) with an average particle diameter of 100 μm and the thermoplastic resin powder A2 (50 parts mass) with an average particle diameter of 130 μm, a circular disc-shaped porous molding with a thickness of 5 mm and a diameter of 47 mm was produced in the same manner as in Example 3.

After evaluating the filtering abilities of the produced porous molding in the same manner as Example 3, the pressure loss was 2 kPa.

Next, after immersing the produced porous molding in a large amount of water and causing it to swell, a swollen gel molding was obtained with a thickness of 5.5 mm and a diameter of 51 mm. Furthermore, after measuring the maximum bending stress of the obtained gel molding in the same manner as Example 1, the maximum bending stress was 11 kgf/cm².

Comparative Example 4

Other than using the dried gel powder A3 with an average particle diameter of 83 μm as the dried powder gel, and using the thermoplastic resin powder A2 with an average particle diameter of 130 μm as the thermoplastic resin powder, a circular disc-shaped porous molding was produced with a thickness of 5 mm and a diameter of 47 mm in the same manner as in Example 3.

After evaluating the filtering abilities of the produced porous molding in the same manner as Example 3, the pressure loss was 4 kPa.

Next, after immersing the produced porous molding in a large amount of water and causing it to swell, a swollen gel molding was obtained with a thickness of 5.9 mm and a diameter of 55 mm. While the gel molding maintained a disc shape, it did not have sufficient strength to be self-supportable. Furthermore, after measuring the maximum bending stress of the achieved gel molding in the same manner as Example 1, the maximum bending stress was 1 kgf/cm².

Comparative Example 5

Other than mixing the dried gel powder A3 (50 parts mass) with an average particle diameter of 83 μm and the thermoplastic resin powder A2 (50 parts mass) with an average particle diameter of 130 μm, a circular disc-shaped porous molding with a thickness of 5 mm and a diameter of 47 mm was produced in the same manner as in Example 3.

After evaluating the filtering abilities of the produced porous molding in the same manner as Example 3, the pressure loss was 4 kPa.

Next, after immersing the produced porous molding in a large amount of water and causing it to swell, a swollen gel molding was achieved with a thickness of 5.8 mm and a diameter of 53 mm. Furthermore, after measuring the maximum bending stress of the achieved gel molding in the same manner as Example 1, the maximum bending stress was 6 kgf/cm2.

Example 6

The dried gel powder B1 (60 parts mass) with an average particle diameter of 110 μm and the thermoplastic resin powder B1 (40 parts mass) with an average particle diameter of 5 μm were mixed, and a circular disc-shaped porous molding with a thickness of 5 mm and a diameter of 47 mm was produced by filling in a circular disc-shaped mold and baking for 10 minutes in an oven of 180° C.

The filtering abilities of the produced porous molding were evaluated by the pressure loss when air was passed through at a rate of 17 L per minute. As a result of the evaluation, the pressure loss of the porous molding was 12 kPa.

Next, after immersing the produced porous molding in a large amount of water and causing it to swell, a swollen gel molding was obtained with a thickness of 5.2 mm and a diameter of 49 mm. The gel molding maintained a disc shape, and had sufficient strength to be self-supportable. Furthermore, after measuring the maximum bending stress of the obtained gel molding in the same manner as Example 1, the maximum bending stress was 84 kgf/cm².

Example 7

Other than using the thermoplastic resin powder B2 with an average particle diameter of 10 μm as the thermoplastic resin powder, a circular disc-shaped porous molding was produced with a thickness of 5 mm and a diameter of 47 mm in the same manner as in Embodiment 6.

After evaluating the filtering abilities of the produced porous molding in the same manner as Embodiment 6, the pressure loss was 5 kPa.

Next, after immersing the produced porous molding in a large amount of water and causing it to swell, a swollen gel molding was obtained with a thickness of 5.2 mm and a diameter of 50 mm. The gel molding maintained a disc shape, and had sufficient strength to be self-supportable. Furthermore, after measuring the maximum bending stress of the obtained gel molding in the same manner as Example 1, the maximum bending stress was 50 kgf/cm².

The results of the Embodiments and the Comparative Examples are shown in Tables 1 to 3. Note that in the tables, "particle collapse" refers to the result of the evaluation of whether or not the particles collapse when swelling due to absorbing water. Also in the tables, "shape maintainability" refers to results where the maximum bending stress of the gel molding is A when it is 20 kgf/cm² or more, B when it is 10 kgf/cm² or more and less than 20 kgf/cm², and C when it is less than 10 kgf/cm².

TABLE 1

| | Dried Gel Powder | | | | Thermoplastic Resin Powder | | | | | |
| --- | --- | --- | --- | --- | --- | --- | --- | --- | --- | --- |
| | Average Particle Diameter $d_2$ (μm) | Average Particle Diameter $d_3$ (μm) | Coefficient of linear expansion α | Coefficient of water absorption (%) | Average Particle Diameter $d_1$ (μm) | $d_2/d_1$ | $(d_3 - d_2)/d_1$ | Ventilation Resistance | Particle collapse | Shape Maintainability |
| Example 1 | 90 | 120 | 0.32 | 50 | 32 | 2.8 | 0.9 | 8 | None | A |
| Example 2 | 60 | 80 | 0.32 | 50 | 32 | 1.9 | 0.6 | 13 | None | A |
| Comparative Example 1 | 440 | 580 | 0.32 | 50 | 32 | 13.8 | 4.4 | 9 | Yes | — |

TABLE 2

| | Dried Gel Powder | | | | Thermoplastic Resin Powder | | | | | |
| --- | --- | --- | --- | --- | --- | --- | --- | --- | --- | --- |
| | Average Particle Diameter $d_2$ (μm) | Average Particle Diameter $d_3$ (μm) | Coefficient of linear expansion α | Coefficient of water absorption (%) | Average Particle Diameter $d_1$ (μm) | $d_2/d_1$ | $(d_3 - d_2)/d_1$ | Ventilation Resistance | Particle collapse | Shape Maintainability |
| Example 3 | 100 | 135 | 0.32 | 50 | 32 | 3.1 | 1.1 | 6 | None | B |
| Example 4 | 100 | 135 | 0.32 | 50 | 32 | 3.1 | 1.1 | 6 | None | A |
| Example 5 | 38 | 50 | 0.32 | 50 | 32 | 1.2 | 0.4 | 17 | None | B |
| Comparative Example 2 | 100 | 135 | 0.32 | 50 | 130 | 0.8 | 0.3 | 2 | Yes | C |
| Comparative Example 3 | 100 | 135 | 0.32 | 50 | 130 | 0.8 | 0.3 | 2 | Yes | B |
| Comparative Example 4 | 83 | 110 | 0.32 | 50 | 130 | 0.6 | 0.2 | 4 | Yes | C |
| Comparative Example 5 | 83 | 110 | 0.32 | 50 | 130 | 0.6 | 0.2 | 4 | Yes | C |

TABLE 3

| | Dried Gel Powder | | | | Thermoplastic Resin Powder | | | | | |
| --- | --- | --- | --- | --- | --- | --- | --- | --- | --- | --- |
| | Average Particle Diameter $d_2$ (μm) | Average Particle Diameter $d_3$ (μm) | Coefficient of linear expansion α | Coefficient of water absorption (%) | Average Particle Diameter $d_1$ (μm) | $d_2/d_1$ | $(d_3 - d_2)/d_1$ | Ventilation Resistance | Particle collapse | Shape Maintainability |
| Example 6 | 110 | 130 | 0.17 | 50 | 5 | 22 | 4.0 | 12 | None | A |
| Example 7 | 110 | 130 | 0.17 | 50 | 10 | 11 | 2.0 | 5 | None | A |

What is claimed is:

1. A porous molding that is achieved by sintering a mixed powder including dried gel powder and thermoplastic resin powder, wherein:
   a ratio of an average particle diameter $d_2$ of the dried gel powder to an average particle diameter di of the thermoplastic resin powder $d_2/d_1$ is 1.3 or more, and
   $d_3$ is an average particle diameter of the dried gel powder when absorbing water and swelling, wherein $(d_3-d_2)/d_1$ is 4.0 or less, and wherein the porous molding is self-supportable before and after the dried gel powder absorbs water and swells.

2. The porous molding according to claim 1, wherein the coefficient of water absorption of the dried gel powder ranges from 30% mass to 90% mass.

3. The porous molding according to claim 1, wherein the average particle diameter $d_1$ of the thermoplastic resin powder ranges from 0.1 μm to 100 μm.

4. The porous molding according to claim 1, wherein the average particle diameter $d_2$ of the dried gel powder ranges from 50 μm to 250 μm.

5. The porous molding according to claim 1, wherein the thermoplastic resin powder includes ultra-high molecular weight polyethylene or polyamide.

6. The porous molding according to claim 1, wherein
   the thermoplastic resin powder includes ultra-high molecular weight polyethylene,
   and the weight-average molecular weight of the ultra-high molecular weight polyethylene ranges from $1.5 \times 10^6$ g/mol to $1.2 \times 10^7$ g/mol.

7. The porous molding according to claim 1, wherein the thermoplastic resin powder is non-spherical.

8. The porous molding according to claim 1, wherein the dried gel powder has at least one type of functional group selected from a group consisting of an ion exchange group and a chelate group.

9. A method for removing metal ion from a processing liquid, comprising
   a step for passing the processing liquid through a filter including a gel molding achieved by the porous molding according to claim 8 swelling with water.

10. A gel molding achieved by the porous molding according to claim 1 being caused to swell with water.

11. A filter including the porous molding according to claim 1.

12. A method for removing moisture from a processing liquid, comprising a step for passing the processing liquid through a filter including the porous molding according to claim 1.

13. The porous molding according to claim 1, wherein the dried gel powder is fixed by the thermoplastic resin forming the self-supportable molding.

14. The porous molding according to claim 1, wherein the self-supportable molding has a shape with first dimensions before the dried gel powder absorbs water and swells and has the same shape with second, different dimensions after the dried gel powder absorbs water and swells.

15. The porous molding according to claim 1, wherein the self-supportable molding is a molding having a maximum bending stress of at least 5 kgf/cm² after the dried gel powder absorbs water and swells.

* * * * *

UNITED STATES PATENT AND TRADEMARK OFFICE
CERTIFICATE OF CORRECTION

| | | |
|---|---|---|
| PATENT NO. | : 10,688,411 B2 | Page 1 of 1 |
| APPLICATION NO. | : 15/536502 | |
| DATED | : June 23, 2020 | |
| INVENTOR(S) | : Mitsuaki Kobayashi | |

It is certified that error appears in the above-identified patent and that said Letters Patent is hereby corrected as shown below:

In the Specification

Column 3
Line 18, delete "Malvem," and insert -- Malvern, --, therefor.
Line 32, delete "Malvem," and insert -- Malvern, --, therefor.

Column 6
Line 7, after "Materials" insert -- . --.

Column 8
Line 18, delete "cherate" and insert -- chelate --, therefor.

Signed and Sealed this
First Day of September, 2020

Andrei Iancu
*Director of the United States Patent and Trademark Office*